(12) United States Patent
Miyashita

(10) Patent No.: US 8,860,279 B2
(45) Date of Patent: Oct. 14, 2014

(54) GENERATOR CORE

(75) Inventor: Toshihito Miyashita, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 295 days.

(21) Appl. No.: 13/306,027

(22) Filed: Nov. 29, 2011

(65) Prior Publication Data

US 2012/0139384 A1 Jun. 7, 2012

(30) Foreign Application Priority Data

Dec. 2, 2010 (JP) ................................ 2010-269602

(51) Int. Cl.
*H02K 1/14* (2006.01)
*H02K 1/18* (2006.01)

(52) U.S. Cl.
CPC ............ *H02K 1/148* (2013.01); *H02K 2201/09* (2013.01)
USPC .............................. 310/216.015; 310/216.016

(58) Field of Classification Search
None
See application file for complete search history.

(56) References Cited

U.S. PATENT DOCUMENTS

2002/0114824 A1 8/2002 Fukui et al.
2011/0187222 A1* 8/2011 Li et al. .................. 310/216.016

FOREIGN PATENT DOCUMENTS

| JP | 2001-327129 | 11/2001 |
| JP | 2002-153036 | 5/2002 |
| JP | 2003-153495 | 5/2003 |
| JP | 2006-034008 | 2/2006 |

* cited by examiner

*Primary Examiner* — Tran Nguyen
(74) *Attorney, Agent, or Firm* — Rankin, Hill & Clark LLP

(57) ABSTRACT

A generator core that increases the amount of power generated by a generator is provided. A plurality of magnetic steel sheets including non-divided magnetic steel sheets and divided magnetic steel sheets are stacked on each other to form a plurality of divided cores. The divided magnetic steel sheets are disposed to form a gap portion that crosses a magnetic path in one magnetic steel sheet. Each gap portion is positioned and shaped such that magnetic resistances of magnetic pole portions of the plurality of divided cores are not different from each other.

3 Claims, 7 Drawing Sheets

GENERATOR CORE

BACKGROUND OF THE INVENTION

1. Technical Field

The present invention relates to a generator core including a yoke and magnetic pole portions.

2. Background Art

Power generating systems that utilize natural energy such as aerogenerator systems and hydrogenerator systems have been drawing attention in recent years. In particular, permanent-magnet generators for aero-power generation are used in many small aerogenerator systems such as mini aerogenerator systems with an output of several kilowatts and micro aerogenerator systems with an output of 1 kW or less. Unlike induction generators, the permanent-magnet generators do not need a power supply to a field winding, and therefore are expected to be utilized in isolated islands and mountain areas as independent power supply facilities. In addition, recently, the permanent-magnet generators have increasingly been installed in parks and on building rooftops in urban areas. However, such small aerogenerator systems require 100 to 200 times power generation costs of large power generating systems. Therefore, cost reduction of power generation is demanded in the field of small aerogenerator systems.

In many cases, the small aerogenerator systems are used as independent power sources. The power generated by a three-phase generator is converted into DC power through a full-wave rectifier and then is utilized either directly or after being accumulated in a battery. The DC power may also be used after frequency conversion via an inverter. Therefore, for better performance of the small aerogenerators, it is necessary to increase the amount of generated power by uninterruptedly using magnetic flux of permanent magnets to increase the induced voltage and by minimizing the phase difference between an induced voltage vector and a generated voltage vector, and to efficiently take out DC power from power of blades by suppressing the winding impedance to a low level. In order to increase the amount of power generated at start-up, it is required to reduce cogging torque and friction torque, and also to reduce iron losses such as a hysteresis loss and an eddy-current loss.

Japanese Patent Application Publication No. 2002-153036 (FIG. 1) discloses an axial-gap generator. This axial-gap generator is of a conventional type and employs a coreless structure having no iron core at the center of a winding. Permanent magnets are disposed on both sides of the winding to interpose the winding. Such a coreless winding structure allows reducing the winding impedance and the iron losses. However, magnetic flux of the permanent magnets is decreased in such a coreless winding structure. Therefore, the permanent magnets are disposed as discussed above to increase magnetic flux.

The structure according to Japanese Patent Application Publication No. 2002-153036 has a number of disadvantages as follows: few heat transfer paths for heat produced by the winding, which likely raises the winding temperature; a narrow gap between the winding and the permanent magnets, which makes it difficult to adjust the gap in assembling the generator; if the winding is molded with a resin, the risk of contact between the permanent magnets and the resin which has thermally been expanded due to the increased temperature of the winding; significantly increased material costs due to a large number of permanent magnets used: and a large inertia moment of the rotor, which increases start-up torque and reduces power generation.

SUMMARY OF THE INVENTION

An object of the present invention is to provide a generator core in which winding inductance is reduced and magnetic flux is suppressed from decreasing.

Another object of the present invention is to provide a generator core that is formed of a small number of component parts and that is easy to assemble.

The present invention aims at the improvement of a generator core including a plurality of divided cores combined with each other and each formed of a plurality of magnetic steel sheets (silicon steel sheets) stacked on each other, the divided cores each including a yoke forming portion and a magnetic pole portion including a magnetic pole column. In the generator core according to the present invention, the plurality of magnetic steel sheets include one or more divided magnetic steel sheets each formed of two types of divided-piece magnetic steel sheets disposed to form a gap portion (gap) that crosses a magnetic path in one magnetic steel sheet, and one or more non-divided magnetic steel sheets, each of which is formed without such gap portion. Each gap portion formed between the two types of divided magnetic steel sheets is positioned and shaped such that magnetic resistances of the magnetic pole portions of the plurality of divided cores are not different from each other (magnetic resistances of the magnetic pole portions of the plurality of divided cores are equal to each other). The thus formed gap portions constitute high magnetic resistance portions in the divided core when the plurality of magnetic steel sheets are stacked on each other.

According to the present invention, it is possible to suppress a reduction in amount of magnetic flux from permanent magnets provided on the rotor side and to reduce the winding inductance by forming the gap portion (gap) in the divided core. Also, according to the present invention, the gap portion (gap) can be easily formed in the divided core by using the one or more divided magnetic steel sheets each formed of the two types of divided-piece magnetic steel sheets. Further, according to the generator core of the present invention, the presence of the gap portions (gaps) can reduce the weight of the generator core, thereby reducing the weight of the generator.

In order to form the gap portions in the divided cores such that magnetic resistances of the magnetic pole portions of the divided cores are not different from each other, the divided cores may preferably be each formed of the divided magnetic steel sheets and the non-divided magnetic steel sheets stacked on each other such that the divided magnetic steel sheets are provided every n sheets in each divided core, n being an integer of 1 or more. For example, if the divided magnetic steel sheets and the non-divided magnetic steel sheets are stacked on each other such that the divided magnetic steel sheets are provided every other sheet, a gap is formed between the two types of divided-piece magnetic steel sheets forming one divided magnetic steel sheet and two non-divided magnetic steel sheets stacked to interpose the divided magnetic steel sheet. In each divided core, a plurality of such gaps are arranged to form an array in the stacking direction, and therefore the gap portions can be formed such that magnetic resistances of the magnetic pole portions of the divided cores are not different from each other.

The two types of divided-piece magnetic steel sheets forming each divided magnetic steel sheet may arbitrarily be shaped as long as the gap portions can be formed such that magnetic resistances of the magnetic pole portions of the plurality of divided cores are not different from each other as discussed above.

Cut-out magnetic steel sheets, each of which is partially cut out, may be used in place of the divided magnetic steel sheets discussed above in order to form a gap portion (gap) that crosses a magnetic path in one magnetic steel sheet. When such cut-out magnetic steel sheets are used, one or more cut-out magnetic steel sheets, each of which is partially cut out to form a gap portion that partially or entirely crosses a magnetic path in one magnetic steel sheet, and one or more non-cut-out magnetic steel sheets, each of which is formed without such gap portion, are prepared as the plurality of magnetic steel sheets. The cut-out magnetic steel sheets are each a single magnetic steel sheet formed by removing a part of a magnetic steel sheet by press cutting. The non-cut-out magnetic steel sheets may be the same in shape and size as the non-divided magnetic steel sheets discussed above. Also when the cut-out magnetic steel sheets are used, each gap portion is positioned and shaped such that magnetic resistances of magnetic pole portions of the plurality of divided cores are not different from each other. Thus, the gap portions can be formed such that magnetic resistances of the magnetic pole portions of the divided cores are not different from each other by using such cut-out magnetic steel sheets to form the divided cores. Therefore, also when the cut-out magnetic steel sheets are used, it is possible to reduce the winding inductance without significantly reducing the amount of magnetic flux of the permanent magnets. Further, when such cut-out magnetic steel sheets are used, the number of component parts is smaller than when the divided magnetic steel sheets are used as discussed above. This facilitates assembly of the core and reduces the assembly cost.

Also when the cut-out magnetic steel sheets are used, the divided cores may each be formed of the cut-out magnetic steel sheets and the non-cut-out magnetic steel sheets stacked on each other such that the cut-out magnetic steel sheets are provided every n sheets in each divided core, n being an integer of 1 or more. Thus, the gap portions can be formed such that magnetic resistances of the magnetic pole portions of the divided cores are not different from each other.

As with when the divided magnetic steel sheets are used as discussed above, the cut-out magnetic steel sheets may arbitrarily be shaped as long as the gap portions can be formed such that magnetic resistances of the magnetic pole portions of the plurality of divided cores are not different from each other. For example, if the cut-out magnetic steel sheets are to be shaped such that the gap portion is located in each magnetic pole column, a part of the magnetic steel sheet forming the magnetic pole column of the divided core may be removed by press cutting to form the gap portion in the magnetic pole column of the divided core as a through hole or a cut-out portion.

The present invention is not limited to the generator core including divided cores to be combined with each other as discussed above, and may also be applied to a generator core that uses an integral core formed of a plurality of magnetic steel sheets stacked on each other and including a yoke and a plurality of magnetic pole portions respectively including magnetic pole columns disposed at predetermined intervals in a direction in which the yoke extends. In the generator core which uses the integral core, one or more divided magnetic steel sheets and one or more non-divided magnetic steel sheets are prepared as the plurality of magnetic steel sheets. The one or more divided magnetic steel sheets are each formed of a plurality of types of divided-piece magnetic steel sheets disposed to form a plurality of gap portions, each of which crosses a magnetic path in one corresponding magnetic steel sheet. Each of the one or more non-divided magnetic steel sheets is formed without such gap portion. For example, the divided magnetic steel sheets may include a single divided-piece magnetic steel sheet serving as a yoke forming portion forming the yoke, and a single divided-piece magnetic steel sheet forming the magnetic pole portions excluding the magnetic pole columns. Alternatively, the divided magnetic steel sheets may include a single divided-piece magnetic steel sheet which forms magnetic pole portions excluding the magnetic pole columns, and a plurality of divided-piece magnetic steel sheets divided for separate magnetic pole portions. The non-divided magnetic steel sheets may include a yoke forming portion forming the yoke, and a plurality of magnetic pole forming portions forming the magnetic pole portions including the magnetic pole columns.

Also when the integral core is used, as with when the divided cores are used, each gap portion is positioned and shaped such that magnetic resistances of the plurality of magnetic pole portions are not different from each other. In the generator core which uses the integral core, it is possible to suppress magnetic flux of permanent magnets from decreasing and to reduce the winding inductance by providing the gap portions inside the core. In addition, when the generator core which uses the integral core is used, it is apparent that the number of component parts is reduced, thereby facilitating the assembly compared to when the divided cores are used. This further reduces the assembly cost.

Also when the integral core is used, the divided magnetic steel sheets and the non-divided magnetic steel sheets may preferably be stacked on each other such that the divided magnetic steel sheets are provided every n sheets in the generator core, n being an integer of 1 or more, in order to form the gap portions such that magnetic resistances of the plurality of magnetic pole portions are not different from each other.

As with when the divided cores are used as discussed above, the plurality of types of divided-piece magnetic steel sheets may arbitrarily be shaped as long as the plurality of gap portions can be formed in the core such that magnetic resistances of the plurality of magnetic pole portions are not different from each other.

The generator core according to the present invention can be used as a stator core for various types of generators such as inner-rotor generators, outer-rotor generators, and linear generators.

DESCRIPTION OF THE PREFERRED EMBODIMENTS

Figure 1:
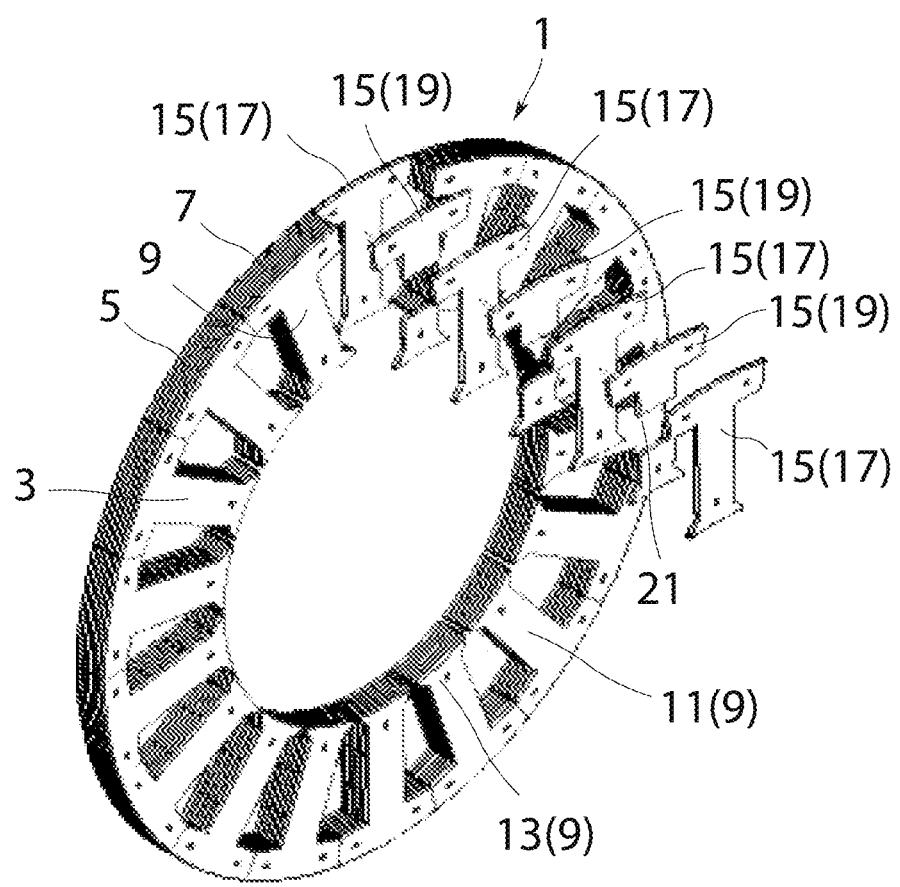
FIG. 1 is a perspective view showing a generator core (using divided cores) according to an embodiment of the present invention.

A generator core according to an embodiment of the present invention will be described below with reference to the drawings. FIG. 1 is a perspective view of a generator core (using divided cores) according to an embodiment in which the present invention is applied to an inner-rotor generator. In FIG. 1, for easy understanding, one of the divided cores is shown as exploded. In FIG. 1, reference numeral 1 denotes a generator core according to the embodiment. The generator core 1 is formed by combining 18 divided cores 3 with each other in an annular arrangement. The divided cores 3 each include a yoke forming portion 7 forming a yoke 5 of the generator core 1, and a magnetic pole portion 9 connected to the yoke forming portion 7. The magnetic pole portion 9 includes a magnetic pole column 11 around which a winding (not shown) is wound, and a pole surface forming portion 13 integrally formed with the magnetic pole column 11 to face a rotor (not shown) to which permanent magnets are attached. Comparing the widths of the respective portions of each divided core 3 in the direction in which the divided cores 3 are arranged to form the generator core 1, the width of the pole surface forming portion 13 is smaller than the width of the yoke forming portion 7, and larger than the width of the magnetic pole column 11. The divided cores 3 are formed of magnetic steel sheets 15 stacked on each other in the thickness direction. The magnetic steel sheets 15 include non-divided magnetic steel sheets 17 and divided magnetic steel sheets 19 formed of silicon steel sheets having a generally T-shaped profile as seen in the thickness direction.

Figure 2A:
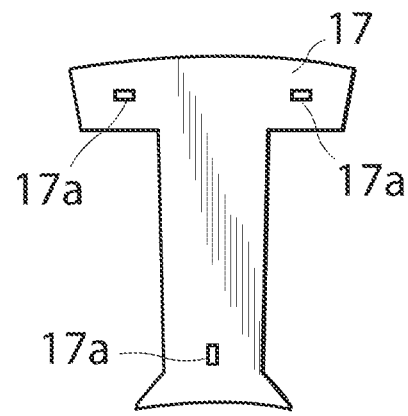
FIG. 2A is a plan view showing a non-divided magnetic steel sheet forming the divided core in the generator core of FIG. 1.
Figure 2B:
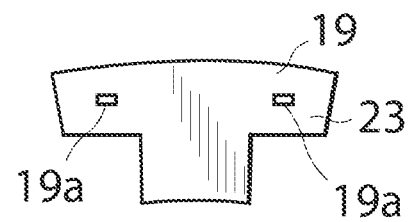
FIG. 2B is a plan view showing an example divided magnetic steel sheet forming the divided core in the generator core of FIG. 1.

FIG. 2A is a plan view showing the non-divided magnetic steel sheet 17 forming a part of the divided core 3 of the generator core 1 of FIG. 1. FIG. 2B is a plan view showing an example of the divided magnetic steel sheet 19 forming a part of the divided core 3. The non-divided magnetic steel sheet 17 is a magnetic steel sheet having a thickness of about 0.35 mm formed without a gap portion (gap) 21 which will be discussed later. The non-divided magnetic steel sheet 17 has a generally T-shaped profile, which is the same as the profile of the divided core 3, as seen in the thickness direction. As shown in FIG. 2A, the non-divided magnetic steel sheet 17 is formed with three caulking portions 17a for stacking. The divided magnetic steel sheet 19 is formed of two types of divided-piece magnetic steel sheets (a yoke-side divided magnetic steel sheet 23 and a pole-side divided magnetic steel sheet 25) disposed to form a gap portion (gap) 21 that crosses a magnetic path in one magnetic steel sheet 15. As shown in FIG. 2B, the divided magnetic steel sheet 19 is also formed with three caulking portions 19a for stacking. Two of the three caulking portions 19a are provided in the yoke-side divided magnetic steel sheet 23. The remaining one caulking portion 19a is provided in the pole-side divided magnetic steel sheet 25.

Each gap portion 21 is positioned and shaped such that magnetic resistances of the magnetic pole portions 9 of the 18 divided cores 3 are not different from each other. Specifically, as shown in FIG. 1, the divided cores 3 are each formed of the non-divided magnetic steel sheets 17 and the divided magnetic steel sheets 19 stacked on each other such that the divided magnetic steel sheets 19 are disposed every other sheet in each divided core 3. In the embodiment, the divided magnetic steel sheets 19 are disposed every other sheet in each divided core 3. However, the divided magnetic steel sheets 19 may be disposed every n sheets in each divided core 3, n being an integer of one or more, as long as the gap portions 21 are formed such that magnetic resistances of the magnetic pole portions 9 of the divided cores 3 are not different from each other. In the embodiment, as shown in FIG. 1, the divided cores 3 are each formed of the non-divided magnetic steel sheets 17 and the divided magnetic steel sheets 19 stacked on and coupled to each other via the caulking portions 17a and the caulking portions 19a, and the yoke-side divided magnetic steel sheet 23 and the pole-side divided magnetic steel sheet 25 are shaped such that the gap portion 21 is located in each magnetic pole column 11 of the divided core 3. In the embodiment, a portion of the non-divided magnetic steel sheet 17 shown in FIG. 2A in which the caulking portions 17a are not formed (a portion of the non-divided magnetic steel sheet 17 forming the magnetic pole column 11 of the divided core 3) is removed by press cutting to form the divided magnetic steel sheet 19 formed of the yoke-side divided magnetic steel sheet 23 and the pole-side divided magnetic steel sheet 25 shown in FIG. 2B. Then, when the non-divided magnetic steel sheets 17 and the divided magnetic steel sheets 19 are stacked on each other as discussed above, the gap portions 21 are formed into three through holes penetrating in the circumferential direction through the magnetic pole column 11 in the divided core 3. In the embodiment, the proportion of the number of the non-divided magnetic steel sheets 17 to the number of the divided magnetic steel sheets 19 in the generator core 1 is determined as 4:3.

Figure 3:
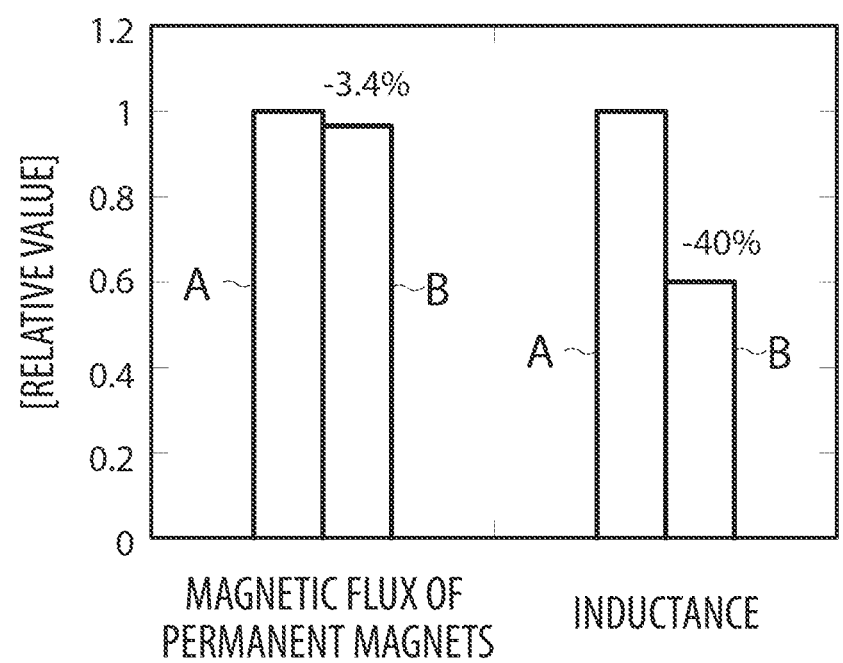
FIG. 3 is a graph showing comparison between a generator using the generator core according to the present invention and a conventional generator in respect of the amount of magnetic flux of permanent magnets and amount of variation in inductance.

The amount of magnetic flux of the permanent magnets and the amount of variation in inductance were measured for a generator B using the generator core 1 according to the embodiment formed by assembling the divided cores 3 having the gap portions 21 as shown in FIG. 1 and a conventional generator A formed by assembling divided cores having no gap portions in an annular arrangement. FIG. 3 shows the measured results. As shown in the graph of FIG. 3, the generator B having the generator core according to the embodiment exhibited that an amount of magnetic flux of the permanent magnets was only 3.4% less than that of the conventional generator A, but exhibited that a winding inductance was as much as 40% less than that of the conventional generator A. That is, when the generator core 1 according to the embodiment was used, the winding inductance was significantly reduced without substantially reducing the amount of magnetic flux of the permanent magnets. As a result, the amount of power generated by the generator was increased as described below.

Figure 4:
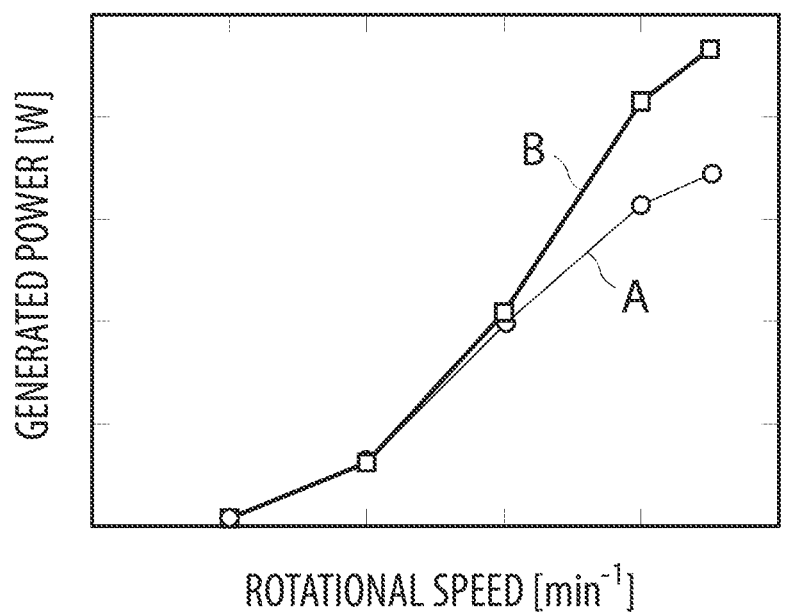
FIG. 4 is a graph showing comparison between the generator using the generator core according to the present invention and the conventional generator in respect of power generation performance.

FIG. 4 is a graph showing the relationship between the rotational speed of the rotor and the power generated by the generator for the generator B using the generator core 1 according to the embodiment and the conventional generator A. As is clearly known from FIG. 4, there was little difference in generated power between the conventional generator A and the generator B using the generator core 1 according to the embodiment in an area in which the rotational speed of the rotor was low. As the rotational speed of the rotor rose, however, the generator B using the generator core 1 according to the embodiment generated power more than the power generated by the conventional generator A. This indicates that the generator B using the generator core 1 according to the embodiment showed higher power generation efficiency than the conventional generator A.

Figure 2B:
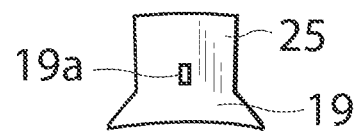
Figure 5:
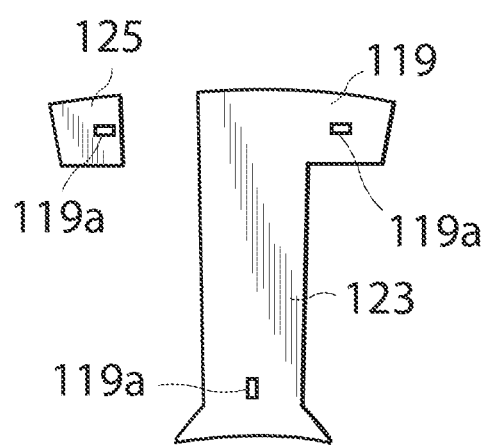
FIG. 5 is a plan view showing another example divided magnetic steel sheet forming a divided core.

FIG. 5 is a plan view showing another example of the divided magnetic steel sheet forming a divided core. Parts of the example shown in FIG. 5 that are the same as those of the example shown in FIG. 2 are denoted by reference numerals obtained by adding 100 to the reference numerals affixed to their counterparts in FIG. 2 and their descriptions are omitted. In the example shown in FIG. 5, a divided magnetic steel sheet 119 is shaped such that the gap portion 21 is located in each yoke forming portion 7 of the divided core 3 when non-divided magnetic steel sheets and the divided magnetic steel sheets 119 are stacked on each other. In the example, a portion of the non-divided magnetic steel sheet 17 shown in FIG. 2A in which the caulking portions 17a are not formed (a portion of the non-divided magnetic steel sheet 17 forming the yoke forming portion 7 of the divided core 3) is removed by press cutting to form the divided magnetic steel sheet 119 formed of a yoke-side divided magnetic steel sheet 123 and a pole-side divided magnetic steel sheet 125 shown in FIG. 5. Then, when the non-divided magnetic steel sheets and the divided magnetic steel sheets 119 are stacked on each other as discussed above, the gap portions 21 form three through holes penetrating in the radial direction through the yoke forming portion 7 in the divided core 3. Thus, here again, the gap portions 21 can be formed such that magnetic resistances of the magnetic pole portions 9 of the divided cores 3 are not different from each other by forming the gap portions 21 in the yoke forming portion 7 as shown in FIG. 5. As a result, also when the divided magnetic steel sheets shown in FIG. 5 are used, the winding inductance is significantly reduced without substantially reducing the amount of magnetic flux of the permanent magnets, and the amount of power generated by the generator is increased, as in the embodiment shown in FIGS. 1 and 2.

Figure 6A:
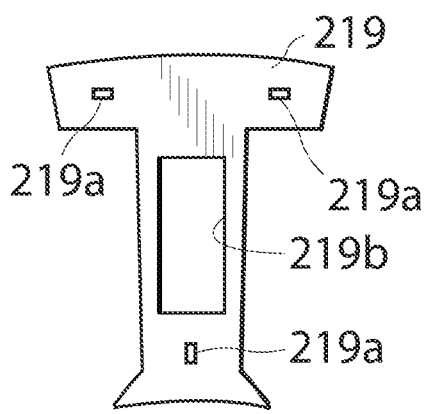
FIGS. 6A to 6C are each a plan view showing a cut-out magnetic steel sheet forming a divided core.
Figure 6B:
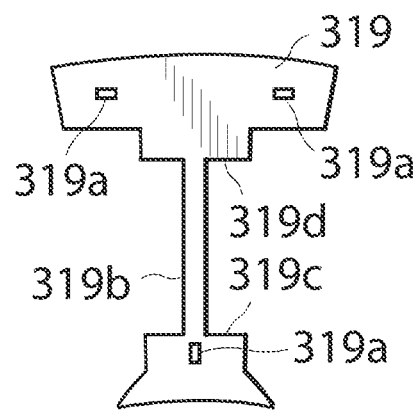
Figure 6C:
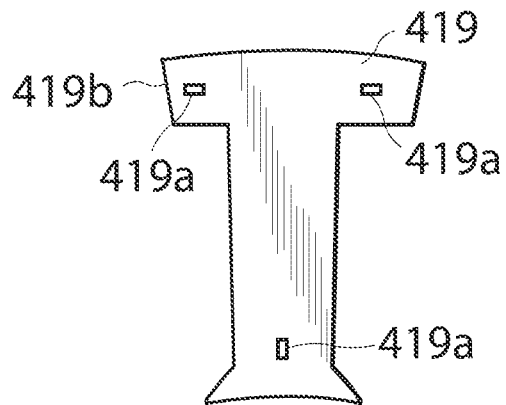

FIGS. 6A to 6C are each a plan view showing a cut-out magnetic steel sheet forming a divided core. Parts of the examples shown in FIGS. 6A to 6C that are the same as those of the embodiment shown in FIG. 2 are denoted by reference numerals obtained by adding 200, 300, and 400, respectively, to the reference numerals affixed to their counterparts in FIG. 2 and their descriptions are omitted. First, in the example of FIG. 6A, a portion of the non-divided magnetic steel sheet 17 shown in FIG. 2A, in which the caulking portions 17a are not formed (a portion of the non-divided magnetic steel sheet 17 forming the magnetic pole column 11 of the divided core 3), is removed by press cutting to form a cut-out magnetic steel sheet 219 having a through hole 219b penetrating in the thickness direction. In the example, non-cut-out magnetic steel sheets, which correspond to the non-divided magnetic steel sheets of FIG. 2A, and the cut-out magnetic steel sheets 219 are stacked on each other so that the through hole 219b forms the gap portion 21. In the example of FIG. 6B, a portion of the non-divided magnetic steel sheet 17 shown in FIG. 2A, in which the caulking portions 17a are not formed (a portion of the non-divided magnetic steel sheet 17 forming the magnetic pole column 11 of the divided core 3), is removed by press cutting to form a cut-out magnetic steel sheet 319 having two cut-out portions 319c and 319d with a coupling portion 319b left after the press cutting. The coupling portion 319b couples a portion forming the yoke forming portion 7 and a portion forming the pole surface forming portion 13. In the example, non-cut-out magnetic steel sheets and the cut-out magnetic steel sheets 319 are stacked on each other so that the two cut-out portions 319c and 319d forms the gap portion 21. In the example of FIG. 6C, a portion of the non-divided magnetic steel sheet 17 shown in FIG. 2A, in which the caulking portions 17a are not formed (a portion of the non-divided magnetic steel sheet 17 forming one end portion of the yoke forming portion 7 of the divided core 3), is removed by press cutting to form a cut-out magnetic steel sheet 419 having a cut-out portion 419b. In the example, non-cut-out magnetic steel sheets and the cut-out magnetic steel sheets 419 are stacked on each other so that the cut-out portion 419b forms the gap portion 21.

Thus, here again, the gap portions 21 can be formed such that magnetic resistances of the magnetic pole portions 9 of the divided cores 3 are not different from each other by using the cut-out magnetic steel sheets shown in FIGS. 6A to 6C to form the divided cores 3. As a result, when the cut-out magnetic steel sheets of FIG. 6C, among the cut-out magnetic steel sheets of FIGS. 6A to 6C, are used, the winding inductance is significantly reduced without substantially reducing the amount of magnetic flux of the permanent magnets, and the amount of power generated by the generator is increased, as in the embodiment shown in FIGS. 1 and 2. When the cut-out magnetic steel sheets of FIGS. 6A and 6B are used, the amount of magnetic flux of the permanent magnets is furthermore reduced compared to when the cut-out magnetic steel sheets of FIG. 6C are used, although the amount of reduced inductance is less than when the cut-out magnetic steel sheets of FIG. 6C are used. In addition, when such integral cut-out magnetic steel sheets are used, the number of component parts is smaller than when the divided magnetic steel sheets are used as discussed above. This further facilitates assembly of the generator core, thereby reducing the assembly cost. The cut-out magnetic steel sheets are each formed of a single magnetic steel sheet. Therefore, the generator core formed of the cut-out magnetic steel sheets has an increased strength compared to the generator core formed of the divided magnetic steel sheets each formed of two types of divided-piece magnetic steel sheets.

Figure 7:
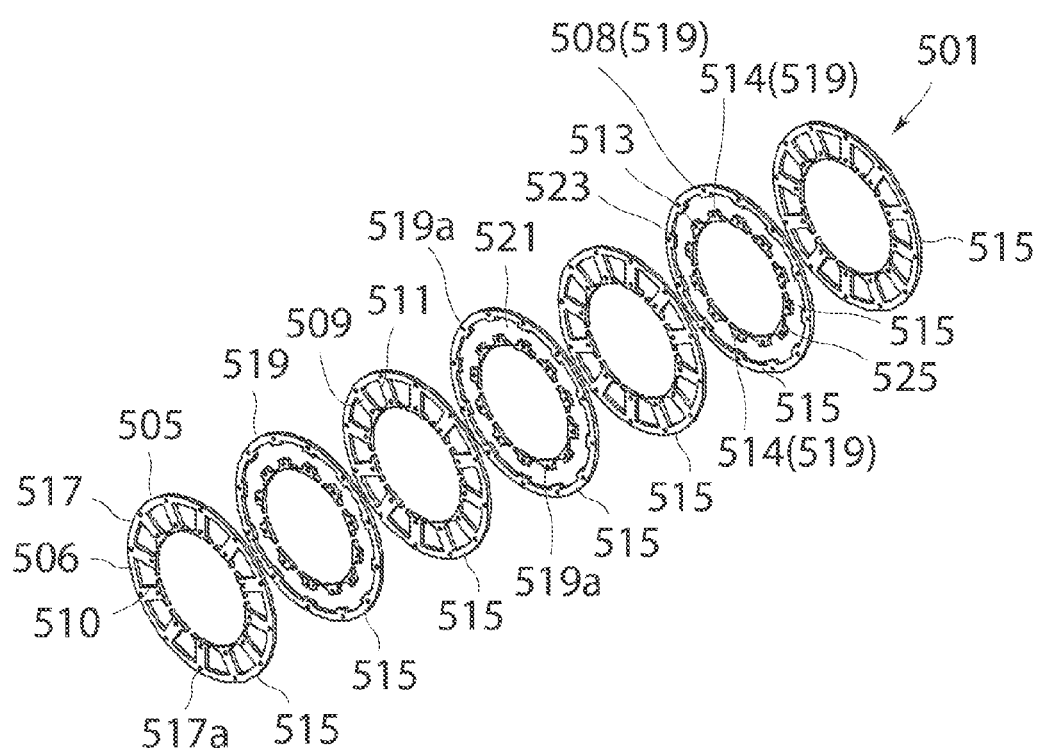
FIG. 7 is an exploded perspective view showing a generator core (using an integral core) according to another embodiment of the present invention.

FIG. 7 is an exploded perspective view of a generator core (using an integral core) according to another embodiment in which the present invention is applied to an inner-rotor generator. A generator core 501 of FIG. 7 includes an annular yoke 505 and 12 magnetic pole portions 509. The magnetic pole portions 509 each include a magnetic pole column 511 and a pole surface forming portion 513, and are disposed at predetermined intervals in a direction in which the annular yoke 505 extends. The generator core 501 is formed of magnetic steel sheets 515 stacked on each other. The magnetic steel sheets 515 forming the generator core 501 include non-divided magnetic steel sheets 517 and divided magnetic steel sheets 519. The non-divided magnetic steel sheets 517 each include a first yoke forming portion 506 forming the yoke 505, and 12 first magnetic pole forming portions 510 coupled to the first yoke forming portion 506 to form the magnetic pole portions 509. As shown in FIG. 7, the non-divided magnetic steel sheets 517 are each formed with 24 caulking portions 517a for stacking. The non-divided magnetic steel sheets 517 are formed without a gap portion 521 which will be discussed later.

The divided magnetic steel sheets 519 are each formed of two types of divided-piece magnetic steel sheets disposed to form a plurality of gap portions 521 that cross a magnetic path in one magnetic steel sheet 515. In the embodiment, the two types of divided magnetic steel sheets include a yoke-side divided magnetic steel sheet 523 each serving as a second yoke forming portion 508 forming the yoke 505, and 12 pole-side divided magnetic steel sheets 525 each serving as a second magnetic pole forming portion 514 forming a pole surface forming portion 513. The second magnetic pole forming portion 514 may be formed of a single pole-side divided magnetic steel sheet in place of the 12 pole-side divided magnetic steel sheets 525. As shown in FIG. 7, the divided magnetic steel sheets 519 are also each formed with 24 caulking portions 519a for stacking. Twelve of the caulking portions 519a are provided in the yoke-side divided magnetic steel sheet 523. The remaining 12 caulking portions 519a are provided in the pole-side divided magnetic steel sheets 525.

As with when the divided cores are used, also when the integral core such as the generator core 501 according to the embodiment is used, each gap portion 521 is positioned and shaped such that magnetic resistances of the 12 magnetic pole portions 509 are not different from each other. Specifically, the generator core 501 is formed of the non-divided magnetic steel sheets 517 and the divided magnetic steel sheets 519 stacked on each other such that the divided magnetic steel sheets 519 are disposed every other sheet in the generator core 501. In the embodiment, four non-divided magnetic steel sheets 517 and three divided magnetic steel sheets 519 are stacked on each other such that the divided magnetic steel sheets 519 are disposed every other sheet. Then, 12 through holes penetrating in the circumferential direction are formed in spaces surrounded by one divided magnetic steel sheet 519 and two non-divided magnetic steel sheets 517 stacked to interpose the divided magnetic steel sheet 519. Such 12 through holes are disposed in three arrays in the stacking direction in the generator core 501. Thus, a total of 36 through holes penetrating in the circumferential direction in which the annular yoke 505 extends are formed as the gap portions 521 in the generator core 501. In the embodiment, as shown in FIG. 7, the non-divided magnetic steel sheets 517 and the divided magnetic steel sheets 519 are stacked on each other via the caulking portions 517a and the caulking portions 519a, and the divided magnetic steel sheets 519 are shaped such that the gap portions 521 are located in the corresponding magnetic pole columns 511 of the divided core 501. In the embodiment, portions of the non-divided magnetic steel sheet 517 shown in FIG. 7, in which the caulking portions 517a are not formed (portions of the non-divided magnetic steel sheet 517 forming the magnetic pole columns 511 of the divided core 501), are removed by press cutting to form the divided magnetic steel sheet 519 formed of the yoke-side divided magnetic steel sheet 523 and the pole-side divided magnetic steel sheet 525 shown in FIG. 7. Then, when the non-divided magnetic steel sheets 517 and the divided magnetic steel sheets 519 are stacked on each other as discussed above, the gap portions 521 are formed as a total of 36 through holes penetrating through the magnetic pole columns 511 in the generator core 501. In the configuration according to the embodiment, the plurality of gap portions 521 are located in the corresponding magnetic pole columns 511. Alternatively, the plurality of types of divided-piece magnetic steel sheets may be shaped such that the plurality of gap portions are located in the yoke.

Thus, here again, the plurality of gap portions 521 can be formed such that magnetic resistances of the magnetic pole portions 509 of the generator core 501 are not different from each other by using the integral core shown in FIG. 7 to form the generator core 501. Thus, when the generator core 501 shown in FIG. 7 is used, the winding inductance is significantly reduced without substantially reducing the amount of magnetic flux of the permanent magnets, and the amount of power generated by the generator is increased, as in the embodiment shown in FIGS. 1 and 2.

Although embodiments and examples of the present invention have been specifically described above, the present invention is not limited to such embodiments and examples, and it is a matter of course that changes or variations may be made based on the technical concept of the present invention. Thus, the present invention is not limited to the inner-rotor generator cores described in relation to the embodiments, and may also be applied to cores for various types of generators such as outer-rotor generators and linear generators.

According to the present invention, a gap portion that partially or entirely crosses a magnetic path in one magnetic steel sheet is formed in a generator core. Thus, it is possible to suppress a reduction in amount of magnetic flux from permanent magnets provided on the rotor side and to reduce the winding inductance. Therefore, when the generator core according to the present invention is used, the amount of power generated by a generator can be increased.

While certain features of the invention have been described with reference to example embodiments, the description is not intended to be construed in a limiting sense. Various modifications of the example embodiments, as well as other embodiments of the invention, which are apparent to persons skilled in the art to which the invention pertains, are deemed to lie within the spirit and scope of the invention.

What is claimed is:

1. A generator core comprising:
a plurality of divided cores, wherein each of the plurality of divided cores is formed of a plurality of magnetic steel sheets stacked on each other, the divided cores each including a yoke forming portion and a magnetic pole portion including a magnetic pole column, the plurality of magnetic steel sheets including one or more divided magnetic steel sheets each formed of two types of divided-piece magnetic steel sheets disposed to form a gap portion that crosses a magnetic path in one magnetic steel sheet, and one or more non-divided magnetic steel sheets, each of the one or more non-divided magnetic steel sheets being formed without the gap portion, wherein
each of the gap portions is positioned and shaped such that magnetic resistances of the magnetic pole portions of the plurality of divided cores are not different from each other;
the divided cores are each formed of the divided magnetic steel sheets and the non-divided magnetic steel sheets stacked on each other such that the divided magnetic steel sheets are provided every n sheets in each divided core, n being an integer of 1 or more; and
the plurality of divided cores are combined with each other to form the generator core having the gap portions.

2. The generator core according to claim 1, wherein the two types of divided-piece magnetic steel sheets are shaped such that the gap portion is located in each magnetic pole column.

3. The generator core according to claim 1, wherein the two types of divided-piece magnetic steel sheets are shaped such that the gap portion is located in each yoke forming portion.

\* \* \* \* \*